UNITED STATES PATENT OFFICE.

KONSTANTIN TARASSOFF, OF MOSCOW, RUSSIA.

METHOD OF MAKING PLASTIC COMPOSITIONS.

1,187,869.  Specification of Letters Patent.  Patented June 20, 1916.

No Drawing.  Application filed February 8, 1916.  Serial No. 77,057.

*To all whom it may concern:*

Be it known that I, KONSTANTIN TARASSOFF, a subject of the Emperor of Russia, residing at Moscow, Russia, have invented certain new and useful Improvements in Methods of Making Plastic Compositions, of which the following is a specification.

In my application for Patent, Serial No. 836,956, filed May 7, 1914, I have described the production of reaction products from phenolic bodies and aldehydes, in admixture with coal tar, wood tar, acid tar, turpentine, rosin, fats and fatty acids. In the process of said application, the reaction is carried out in the presence of a condensing agent of a novel type, such as one of the sulfo-aromatic acids, sulfonated fats and oils, or in particular one of the sulfo-acids such as are contained in acid-tar, (derived from the treatment of petroleum or its distillates with sulfuric acid) which agents have the property of aiding in the production of relatively stable emulsions of oily bodies and water.

I have now found that in producing a reaction between a phenolic elastic body and an aldehyde, hard condensation products can be formed, not only with the materials stated in the above mentioned application, but also with proteid bodies (such as albumin, casein, gelatin, glue) tanning agents (such as tannin, catechu, coloring extracts) carbohydrates (such as starch, dextrin, sugar, molasses). These substances are in addition to the sulfo-acids or equivalent materials above referred to.

The above mentioned added materials (proteid bodies, tanning agents or carbohydrates) can not conveniently be used when a mineral acid, such as sulfuric or hydrochloric is employed as the condensing agent, since the reaction either does not proceed at all, or takes place very unequally, and the resulting products are non-homogeneous, brittle, and accordingly not well adapted for the ordinary purposes for which such products are intended.

In order to fully explain my invention, the following examples are given, to which the invention is, however, not limited.

Example 1: A mixture of 100 grams of commercial phenol, 57 grams of a 37% aqueous solution of the sulfo-acids produced from acid tar (a waste product in the petroleum industry) 20 grams of egg albumin and 50 grams of water is made. This mixture is heated on a water bath while being stirred, up to 75 or 80° C. The heating is continued until the albumin has dissolved, and about 50 grams of the water has evaporated. The material is then cooled and 40 grams of commercial formaldehyde solution are added. The mixture is then again heated to 60 or 80° C., which produces a condensation reaction which is accompanied by a rather violent boiling. After the mass has become quiet, it is further heated until about 50 grams more of the water have been evaporated, then cooled to 20 or 25° C., and another 50 grams of commercial formaldehyde solution are added. The mass thus produced is a rather thick liquid, which is poured into a suitable mold, which may be a test tube or any other desired form of mold, and is then allowed to stand at ordinary temperature for ten to twelve hours. During this time the product becomes more viscous and nearly solid. The molds are then placed in a bath of water at about 75° C., for a half hour, then heated to 85 or 90° C., for one to two hours, and thereafter heated to about 100° C., for one to two hours. The product of this example is about 205 grams of a very hard, elastic infusible, opaque bluish yellow solid.

In example 1, various other albuminous materials may be substituted in place of the egg albumin, for example blood albumin, gelatin, casein, carpenter's glue or the like.

Example 2: 100 grams of phenol, 50 grams of formaldehyde (40% solution) and 50 grams of the sulfo-acids (37% solution) are mixed, to this mixture is added 30 to 40 grams of potato flour or wheat starch. This mixture is heated to 40 to 45° C., whereupon the starch expands and a thick jelly-like mass is produced which after boiling becomes somewhat thinner, while the starch is converted into a slimy deposit which settles to the bottom of the vessel. This material is then stirred, producing a homogeneous mass which is then heated until about 50 to 60 grams of water have evaporated. After cooling to 20 or 25° C., 40 grams of formaldehyde solution are added, the mixture stirred, thereby forming a rather thick tarry mass which is poured into molds and thereafter treated as in Example 1.

Example 3: A mixture of 100 grams of commercial carbolic acid, 30 grams of potato pulp, 20 grams of the sulfo-acid (Twitchel's reagent) and 45 grams of 40% formaldehyde is heated to 50 to 70° C., which initiates the reaction and produces more or less boiling. The product at this stage is a tarry mass, which is heated until 40 to 45 grams of the water have evaporated. It is then cooled and another 45 grams of formaldehyde solution are added, the mass poured into molds and further treated as in Example 1. In this example about 190 grams of a gray, opaque, hard product are obtained.

Example 4: A mixture of 100 grams of commercial carbolic acid, 50 grams of 40% solution of sulfo-acid, 60 grams of a 50% aqueous solution of crystalline tannin, and 40 grams of 40% commercial formaldehyde is heated to 60 or 80° C. The mixture begins to boil due to the heat of reaction. When the reaction slows down the mass is well stirred, the heating continued (while weighing at intervals) until the mass has lost about 70 or 75 grams in weight. It is then cooled to 20 or 25° C., an additional 50 grams of 40% aldehyde solution are added, thereby producing a homogeneous oily-appearing liquid. This is poured into molds and treated as in Example 1. The product of this example is a hard, infusible mass having a chestnut yellow color.

It is obvious that, in the above examples, the proportions may be varied more or less, which will of course produce variation in the hardness and elasticity of the products.

Where, in the appended claims I use the expression "albuminous material" I intend to cover thereby as alternative materials, not only albumin, casein, gelatin and glue, but also carbohydrates and tannins.

What I claim is:—

1. In the production of plastic bodies containing condensation products of the phenol-aldehyde type, the step of condensing an aldehyde and a phenol in the presence of a sulfo-acid as a condensing agent, and in the presence of a soluble albuminous material and a material capable of acting as a solvent for such albuminous material.

2. In the production of plastic bodies containing condensation products of the phenol-aldehyde type, the step of adding to the materials capable of producing such a condensation product, sulfo-acid as a condensing agent, and a dissolved albuminous material.

3. A process of making a plastic composition which comprises reacting upon a phenol with an aldehydic methylene-containing body, in the presence of a sulfo-acid body having emulsifying properties as a condensing agent, and in the presence of a water-soluble albuminous substance.

4. A process of making a plastic composition which comprises reacting upon a phenol with an aldehydic methylene-containing body, in the presence of a condensing agent comprising a sulfo-acid body having emulsifying properties, and in the presence of a solution of an albuminous substance.

5. A process which comprises reacting upon a phenol with formaldehyde in the presence of a sulfo-acid, as a condensing agent, and in the presence of a dissolved proteid substance.

6. A process which comprises reacting upon a phenol with formaldehyde in the presence of a sulfo-acid, as a condensing agent, and in the presence of dissolved albumin.

In testimony whereof I affix my signature in presence of two witnesses.

KONSTANTIN TARASSOFF.

Witnesses:
BOROS MOOSIK,
PETER SHERBOROFF.